United States Patent
Halperin et al.

[11] Patent Number: 5,547,586
[45] Date of Patent: Aug. 20, 1996

[54] METHOD AND APPARATUS FOR THE DESALINATION OF SALT CONTAINING WATER

[75] Inventors: Mitchell L. Halperin, North York; Surinder Cheema-Dhadli, Mississauga, both of Canada

[73] Assignee: Rossmark Medical Publishers, Inc., Stirling, Canada

[21] Appl. No.: 236,175

[22] Filed: May 2, 1994

[51] Int. Cl.⁶ ............................................. C02F 9/00
[52] U.S. Cl. ........................... 210/686; 210/266; 210/282
[58] Field of Search ................................. 210/664, 665, 210/668, 669, 685, 686, 702, 764, 202, 266, 282, 501

[56] References Cited

U.S. PATENT DOCUMENTS

| | | | |
|---|---|---|---|
| 3,617,554 | 11/1971 | Thorborg | 210/664 |
| 4,135,985 | 1/1979 | La Rocca | 202/176 |
| 4,161,445 | 7/1979 | Coillet | 210/181 |
| 4,170,514 | 10/1979 | Pagani | 159/18 |
| 4,198,296 | 4/1980 | Doumas et al. | 210/501 |
| 4,280,913 | 7/1981 | Applegate et al. | 210/669 |
| 4,310,396 | 1/1982 | Demaire et al. | 204/151 |
| 4,366,027 | 12/1982 | Lauro | 202/174 |
| 4,389,311 | 6/1983 | La Freniere | 210/282 |
| 4,391,676 | 7/1983 | Torberger | 202/173 |
| 4,421,461 | 12/1983 | Hicks et al. | 417/53 |
| 4,500,433 | 2/1985 | Ormsby | 210/669 |
| 4,511,436 | 4/1985 | Nasser | 202/174 |
| 4,514,260 | 4/1985 | Nasser | 202/270 |
| 4,539,088 | 9/1985 | Kaneda et al. | 204/182.5 |
| 4,539,091 | 9/1985 | Kaneda et al. | 204/301 |
| 4,684,471 | 8/1987 | Manojlovic | 210/665 |
| 4,735,722 | 4/1988 | Krepak | 210/500.23 |
| 4,749,537 | 6/1988 | Gautschi et al. | 210/764 |
| 4,886,597 | 12/1989 | Wild et al. | 210/321.68 |
| 4,954,623 | 9/1990 | Nagarajan | 536/127 |
| 5,078,880 | 1/1992 | Barry | 210/512.1 |
| 5,082,564 | 1/1992 | Halff et al. | 210/638 |
| 5,110,468 | 5/1992 | Miyashita et al. | 210/424 |

FOREIGN PATENT DOCUMENTS 1064630  10/1979  Canada.

*Primary Examiner*—Ivars Cintins
*Attorney, Agent, or Firm*—Riches, McKenzie & Herbert

[57] ABSTRACT

A method and kit for chemically rendering saline water safe to drink is disclosed. The kit includes a chemical reactant which on contact with the saline water is operable to bond with free sodium and chloride ions in the water and exchange therefore, carbonate, bicarbonate and hydrogen ions. The substituted carbonate, bicarbonate and hydrogen ions combining to form biologically safe water and carbon dioxide molecules.

19 Claims, 1 Drawing Sheet

METHOD AND APPARATUS FOR THE DESALINATION OF SALT CONTAINING WATER

SUMMARY OF THE INVENTION

The present invention relates generally to a method and apparatus for the desalination of salt containing water, and more particularly to a method and apparatus which chemically renders saline water, such as sea water, biologically safe for drinking.

BACKGROUND OF THE INVENTION

It has long been desired to provide an economical and easily portable apparatus for desalinating and purifying sea water, and which is capable for use in providing an emergency supply of drinking water for sailors, airline crash survivors and oil rig workers who are stranded in life boats, survival suits and the like.

Conventional apparatus used in sea water desalination operate on the principle of reverse osmosis. Reverse osmosis desalinators operate by the user pumping sea water through a membrane which selectively filters sodium and chloride ions from the water. Examples of such reverse osmosis desalinators are disclosed in U.S. Pat. No. 4,161,445 to Coillet, issued Jul. 17, 1979, and U.S. Pat. No. 5,082,564 to Helff, issued Jan. 21, 1992.

A further constraint of reverse osmosis desalinators is that the reverse osmosis technology requires complex manufacturing, making such desalinators prohibitively expensive to most small boat operators and yachtsmen. The high cost of conventional reverse osmosis desalinators make them prohibitively expensive for individual use, as for example packaged in individual survival gear.

The membranes used in reverse osmosis desalinators must be manufactured sufficiently thin to enable the selective transmittal of water, making reverse osmosis desalinators very fragile and susceptible to damage and failure. Reverse osmosis desalinators are not fail-safe, as if the membrane does fail, potable water may not be produced at all.

A major disadvantage of reverse osmosis desalinators is that they are impractical for use in all survival situations. The requirement of a pump mechanism makes conventional desalinators too large to be packaged as part of a life jacket or survival suit. Reverse osmosis desalinators suffer the limitation therefore that they are typically only used in conjunction with life rafts and boats.

While chemical desalinators have been proposed, such as that disclosed in Canadian Patent No. 1,064,630 to Doumas et al, issued Oct. 16, 1979, heretofore the purification of sea water by chemical means has been largely unsuccessful.

The chemical desalinator disclosed in C.P. 1,064,630 incorporates as part of an "ion exchange resin bed" a silver nitrate salt absorbed or impregnated on activated charcoal. The silver nitrate salt provides a source of free silver ions for use in killing bacteria. As a salt is provided which introduces free silver ions, there is also necessitated an ion exchange resin which removes the introduced free silver ions, as ingestion of free silver ions itself could be harmful to the user.

Studies of the effectiveness of the purification of sea water treated with silver nitrate salt "briquettes" show that conventional chemical desalinators produce treated water which may have a pH as high as 11.0. Known chemical desalinators suffer the further disadvantage that they are largely ineffective at removing chloride ions as well as other potentially harmful ions which are found in sea water, such as sulphate ($SO_4^=$), phosphate ($HPO_4^=$), potassium ($K^+$), calcium ($Ca^{+2}$) and magnesium ($Mg^{+2}$) ions, and the treated water produced after conventional chemical treatment is frequently both muddy brown in colour, and frequently exhibits an unpleasant odour.

SUMMARY OF INVENTION

Accordingly, it is an object of the present invention to at least partially overcome the disadvantages of the prior art devices by providing a kit which is chemically operable to substitute for free chloride ($Cl^-$) ions and sodium ($Na^+$) ions in saline water, ions which combine to form a precipitate and are removed from the solution making it biologically safe.

Another object of the invention is to provide a light weight and easily portable emergency kit for use in the desalination of saline water suitable for storage within a pocket of a survival suit or life jacket.

A further object of the invention is to provide a rugged, fail-safe and inexpensive kit having a substantial shelf life for use in producing biologically safe, pleasant tasting drinking water from sea water.

Another object of the invention is to provide a simplified kit which provides a user with a visual indicator of when sea water has been rendered biologically safe to drink.

In furtherance of these objects, the present invention provides a chemically based method and apparatus for desalinating water. Saline water, such as sea water, is contacted with a chemical reactant composition which includes firstly, a solid compound or composition which binds free chloride ($Cl^-$) anions, and releases in substitution for the chloride ($Cl^-$) anions, carbonate ($CO_3^=$) ions and/or bicarbonate ($HCO_3^-$) ions; and secondly, a substance which binds free sodium ($Na^+$) cations and releases in substitution for the sodium ($Na^+$) cations, hydrogen ($H^+$) ions.

By the use of the composition of the present invention, sodium ($Na^+$) and chloride ($Cl^-$) ions are removed from the saline water, and carbonate ($CO_3^=$), bicarbonate ($HCO_3^-$) and hydrogen ($H^+$) ions are released. The released carbonate ($CO_3^=$) ions and bicarbonate ($HCO_3^-$) ions bond with the released hydrogen ($H^+$) ions by the buffering reactions:

$$H^+ + CO_3^= \rightarrow HCO_3^-$$

and $$H^+ + HCO_3^- \rightarrow H_2O + CO_2$$

The net result is therefore the formation of biologically harmless molecules in the treated volume of water.

In accordance with the present invention, the applicant has discovered that $Ag_2CO_3$ as a solid compound or as part of a composition in solid form, advantageously may be incorporated into the chemical reactant for use in removing free chloride ($Cl^-$) ions. When $Ag_2CO_3$ is contacted with saline water, chloride ($Cl^-$) ions in the water bond with the silver ($Ag^+$) ions, releasing free carbonate ($CO_3^=$) ions under the reaction:

$$2Cl^- + Ag_2CO_3 \rightarrow 2AgCl + CO_3^=$$

In this manner carbonate ($CO_3^=$) ions are exchanged for the chloride ($Cl^-$) ions in the saline water.

A cation exchange resin having hydrogen ($H^+$) ions releasably bound thereto is advantageously incorporated into the chemical reactant for use in reducing the concentration of sodium ($Na^+$) cations. On the cation exchange resin contacting the water, sodium ($Na^+$) cations in the water bind with the resin preferentially over the hydrogen ($H^+$) ions. As the sodium ($Na^+$) cations are bound, hydrogen ($H^+$) ions are released into the water in substitution for the sodium ($Na^+$) ions under the reaction:

$$Resin \cdot H^+ + Na^+ \rightarrow Resin \cdot Na^+ + H^+$$

The cation exchange resin advantageously also acts to remove other potentially harmful cations, such as $Mg^{+2}$, $K^+$ and $Ca^{+2}$ cations by the reactions:

$$Resin \cdot H^+ + Mg^{+2} \rightarrow Resin \cdot Mg^{+2} + H^+$$

$$Resin \cdot H^+ + K^+ \rightarrow Resin \cdot K^+ + H^+$$

$$Resin \cdot H^+ + Ca^{+2} \rightarrow Resin \cdot Ca^{+2} + H^+$$

By the buffering reactions previously stated, the free carbonate ($CO_3^=$) ions then bond with and buffer the free hydrogen ($H^+$) ions to produce water and carbon dioxide molecules.

Where the reactant composition is used as part of a survival kit to render sea water biologically safe to drink, the composition more preferably includes substances to remove other potentially harmful ions, such as sulphate ($SO_4^=$) ions, and phosphate ($HPO_4^=$) ions. To remove sulphate ($SO_4^=$) and phosphate ($HPO_4^=$) ions, the reactant composition preferably includes an anion exchange resin which has carbonate ($CO_3^=$) ions, and/or a bicarbonate ($HCO_3^-$) ions and/or hydroxyl ($OH^-$) ions releasably bound thereto. The anion exchange resin is selected so that on contact with sea water, sulphate ($SO_4^=$) ions and/or phospate ($HPO_4^=$) ions in the sea water preferentially bind to the anion exchange resin in substitution for the releasably bound carbonate ($CO_3^=$), bicarbonate ($HCO_3^-$) and/or hydroxyl ($OH^-$) ions.

As sulphate ($SO_4^=$) ions and/or phospate ($HPO_4^=$) ions are bound with the anion exchange resin, the carbonate ($CO_3^=$), bicarbonate ($HCO_3^-$) and/or hydroxyl ($OH^-$) ions are released into the water in substitution therefore, which then bind with and buffer free hydrogen ($H^+$) ions which have been released from the cation exchange resin.

By the present invention, sodium ($Na^+$) and chloride ($Cl^-$) ions, together with other potentially harmful ions such as sulphate ($SO_4^=$) ions, are bound into a solid composition which can readily be removed from the volume of water which has been treated. Further, on binding of sodium ($Na^+$) and chloride ($Cl^-$) ions into the solid, there is a corresponding release of ions which bond together forming biologically harmless molecules.

Accordingly, in one of its aspects the present invention resides in a method of producing biologically safe drinking-water from saline water comprising the steps of: contacting said water with a first compound or composition selected to chemically bond with chloride anions in said water and exchanging for said chloride anions, anions selected from the group consisting of carbonate ions and bicarbonate ions; contacting said water with a second composition selected to chemically bond with sodium cations in said water and exchanging for said sodium cations hydrogen ions, wherein said anions selected from the group consisting of carbonate ions and bicarbonate ions buffer said hydrogen ions to produce carbon dioxide and water.

In another aspect, the present invention resides in a kit for producing biologically safe drinking-water from saline water, the kit comprising a container and reactant, the container for holding a volume of said water and the reactant, and having an inlet for introducing the water into the container, the reactant comprising means for removing chloride ions from said water and exchanging for said chloride ions, anions selected from the group consisting of carbonate ions and bicarbonate ions, and means for removing sodium cations from said water and exchanging for said sodium cations hydrogen ions.

BRIEF DESCRIPTION OF THE DRAWINGS

Further objects and advantages of the invention will appear from the following description together with the accompanying drawings in which.

DETAILED DESCRIPTION OF THE DRAWINGS

Figure 1:
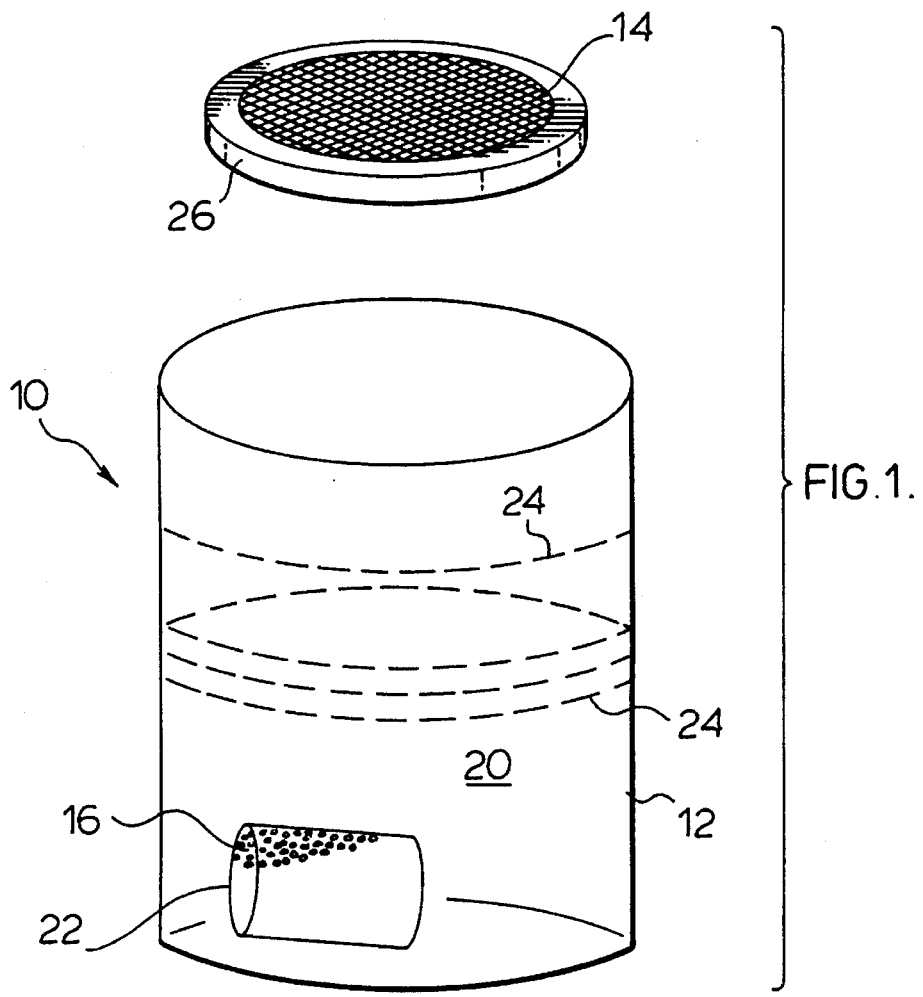
FIG. 1 is a perspective pictoral view showing a kit for treating saline water in use in accordance with the present invention.
Figure 2:
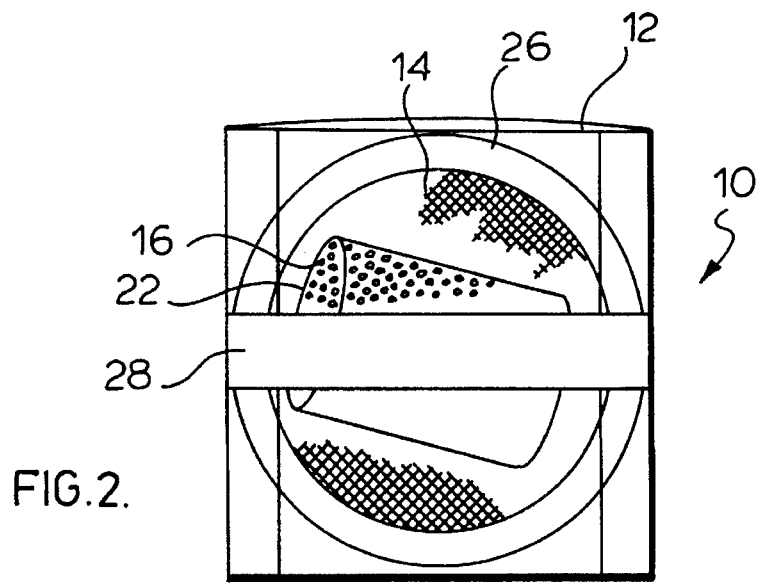
FIG. 2 is a pictoral view of the kit of FIG. 1 folded for storage prior to use.

FIGS. 1 and 2 show a kit 10 for use in chemically rendering a volume of sea water 20 biologically safe to drink. The kit 10 includes a collapsible plastic bag 12, an organic filter 14 and a packet of deionizing chemical reactant 16 encapsulated within a selectively permeable membrane 22.

The chemical reactant 16 is chosen such that on contact with the volume of sea water 20, free chloride ($Cl^-$), sodium ($Na^+$) and other potentially harmful ions in the sea water 20 chemically bond with the reactant 16, and there is a corresponding release of hydrogen ($H^+$) ions together with carbonate ($CO_3^=$), and/or bicarbonate ($HCO_3^-$) ions. The reactant 16 is a solid composition including a compound or composition comprising $Ag_2CO_3$, a cation exchange resin and an anion exchange resin.

The $Ag_2CO_3$ composition is included in the reactant 16 for use in removing chloride ($Cl^-$) ions from the water 20, and chemically exchanging therefore, carbonate ($CO_3^=$) and/or bicarbonate ($HCO_3^-$) ions. On contacting the reactant 16 with the volume of water 20, free chloride ($Cl^-$) ions present in the water 20 combine with silver ($Ag^+$) ions existing in almost instantaneous equilibrium with the solid $Ag_2CO_3$, to produce a solid precipitate $AgCl$ and release carbonate ($CO_3^=$) and bicarbonate ($HCO_3^-$) ions by the reactions:

$$2Cl^- + Ag_2CO_3 \rightarrow 2AgCl + CO_3^= \qquad (I)$$

and $$Cl^- + AgHCO_3 \rightarrow AgCl + HCO_3^- \qquad (II)$$

$Ag_2CO_3$ is particularly suitable for use in the present invention. $Ag_2CO_3$ has an extremely low solubility in water of less than 0.0032 grams per 100 cc in cold water, so it does not tend to dissolve in solution, minimizing the potential for large molar quantities of silver to dissolve in solution whereby it may be ingested. In water 20, $Ag_2CO_3$ therefore exists in an equilibrium with a very fast and almost simultaneous existence with free silver ($Ag^+$) ions and free carbonate ($CO_3^=$) ions. Free silver ($Ag^+$) ions tend almost immediately to bond with either chloride ($Cl^-$) ions, carbonate ($CO_3^=$) ions and/or bicarbonate ($HCO_3^-$) ions.

Once the silver ($Ag^+$) ions have bonded with the chloride ($Cl^-$) ions under reactions (I) and (II), the resulting $AgCl$ forms a solid precipitate which exhibits a still lower solubility of less than 0.00008 grams per 100 cc in cold water. The lower solubility of the resulting $AgCl$ precipitate advantageously reduces the likelihood of the reaction reversing to free chloride (Cl⁻) ions and silver (Ag⁺) ions once the AgCl precipitate has formed. With silver (Ag⁺) cations bonding with free chloride (Cl⁻) ions aggressively to form the AgCl precipitate, silver (Ag⁺) cations remain bound after completion of the reaction and are not released into the water 20. The use of $Ag_2CO_3$ thereby advantageously eliminates the necessity of including further ion exchange resins for the removal of released free silver (Ag⁺) ions.

The cation exchange resin is provided in the reactant 16 for use in removing sodium (Na⁺) ions from the water 20. The cation exchange resin has hydrogen (H⁺) ions releasably bound thereto, and is chosen to preferentially bond with free sodium (Na⁺) cations. On contacting the reactant 16 with the volume of water 20, free sodium (Na⁺) ions in the water 20 bind with the cation exchange resin in substitution for the hydrogen (H⁺) ions, whereby on the sodium (Na⁺) ions binding with the cation exchange resin, the hydrogen (H⁺) are released into the water 20 under the reaction:

$$\text{Resin·H}^+ + \text{Na}^+ \rightarrow \text{Resin·Na}^+ + \text{H}^+ \tag{III}$$

By the use of the cation exchange resin, one-way substitution of free hydrogen (H⁺) ions for free sodium (Na⁺) ions in the water 20 is achieved.

Cation exchangers on Dextran, agarose, cellulose and polystyrene are all suitable for use within the present invention. Particularly suitable are cation exchange resins on polystyrene which include a sulfonic acid group thereon, such as those sold under the trade mark DOWEX cation exchangers.

Under reaction (III), the use of the a cation exchange resin advantageously also acts to remove concentrations of other potentially harmful cations which are typically found in sea water. Potassium (K⁺) ions, magnesium ($Mg^{+2}$) ions and calcium ($Ca^{+2}$) ions present in lesser quantities are also bound to the cation exchange resin, in substitution for the hydrogen (H⁺) ions in essentially the same manner as the sodium (Na⁺) ions.

The result of contacting the reactant 16 with volume of water 20 is the binding of chloride (Cl⁻) and sodium (Na⁺) ions, together with other potentially harmful cations, into the solid reactant 16, and the release of free carbonate ($CO_3^=$), bicarbonate ($HCO_3^-$) and hydrogen (H⁺) ions into the water 20.

The carbonate ($CO_3^=$) ions and bicarbonate ($HCO_3^-$) ions released by reactions (I) and (II) bond with and buffer the free hydrogen (H⁺) ions released by reaction (III) to form water and carbon dioxide molecules under the buffering reactions:

$$H^+ + CO_3^= \rightarrow HCO_3^- \tag{IV}$$

$$H^+ + HCO_3^- \rightarrow H_2O + CO_2 \tag{V}$$

The net effect of contacting the reactant with the water 20 is therefore the replacement of chloride (Cl⁻) ions and sodium (Na⁺) ions by biologically safe water ($H_2O$) and carbon dioxide ($CO_2$) molecules.

Although not essential, the anion exchange resin is preferably included in the reactant 16 for removing other potentially harmful anions such as sulphate ($SO_4^=$) and/or phospate ($HPO_4^=$), ($H_2PO_4^-$) anions which may be present in the water 20. Anion exchange resins having carbonate ($CO_3^=$) ions, and/or a bicarbonate ($HCO_3^-$) ions and/or hydroxyl (OH⁻) ions releasably bound thereto are particularly suitable for this purpose. The anion exchange resin is selected so that free sulphate ($SO_4^=$) and/or phosphate ($HPO_4^=$), ($H_2PO_4^-$) ions preferentially bond thereto in substitution for the releasably bound hydroxyl (OH⁻), bicarbonate ($HCO_3^-$) or carbonate ($CO_3^=$) ions, as for example by the reactions:

$$\text{Resin·CO}_3^= + SO_4^= \rightarrow \text{Resin·SO}_4^= + CO_3^= \tag{VI}$$

$$\text{Resin·CO}_3^= + HPO_4^= \rightarrow \text{Resin·HPO}_4^= + CO_3^= \tag{VII}$$

$$\text{Resin·OH}^- + H_2PO_4^- \rightarrow \text{Resin·H}_2PO_4 + OH^- \tag{VIII}$$

The released carbonate ($CO_3^=$) ions will react with the free hydrogen (H⁺) ions released by the bonding of sodium (Na⁺) cations with the cation exchange resin under reaction (III) in accordance with buffering reactions (IV) and (V). Bicarbonate ($HCO_3^-$) or hydroxyl (OH⁻) ions released by the anion exchange resin will similarly combine with hydrogen (H⁺) ions to form carbon dioxide ($CO_2$) and/or water ($H_2O$) molecules.

Resins particularly suitable for use as anion exchange resins include anion exchangers on Dextran, anion exchangers on agarose, anion exchangers on cellulose and ion exchangers on polystyrene such as those sold under the trade mark DOWEX anion exchangers.

As is to be appreciated, buffering carbonate ($CO_3^=$) ions are released by reactions (I) and (II) in approximately a 1:2 ratio with the chloride ions, and free hydrogen (H⁺) ions are released by reaction (III) in approximately a 1:1 ratio with sodium (Na⁺) ions. By the use of the present invention there is therefore a neutral acid-base solution produced from the treated water rather than the natural alkalinity of sea water which has a pH of approximately 8 to 9. Table 1 lists the concentrations of the major ions in sea water.

TABLE 1

| Major ions in average seawater | Concentration (moles/kilogram) | Amount of ion occurring as free ion (%) |
|---|---|---|
| Na⁺ | 0.475 | 99 |
| Mg²⁺ | 0.054 | 87 |
| Ca²⁺ | 0.010 | 91 |
| K⁺ | 0.010 | 99 |
| Cl⁻ | 0.56 | 100 |
| SO₄⁼ | 0.028 | 54 |

Source: After Garrels, R. M., and M. E. Thompson, 1962, A Chemical model for seawater, Am. J. Sci., v. 260, pp. 57–66.

As is to be appreciated, the inclusion of an anion exchange resin adapted to release carbonate ($CO_3^=$), bicarbonate ($HCO_3^-$) and/or hydroxyl (H⁻) ions further assists to counter increased acidity as a result of the release of hydrogen (H⁺) ions under reaction (III).

To minimize the likelihood of the user ingesting any of the reactant 16, the reactant 16 is sealed within a selectively permeable membrane 22. The selectively permeable membrane 22 is chosen to permit the transmission of ions, water and carbon dioxide molecules therethrough, while preventing the release into the bag 12 of the solid $Ag_2CO_3$, the resulting precipitate AgCl and the cation and anion exchange resins. The membrane 22 advantageously assists the user in removing the reactant 16 from the volume of water 20 after it has been rendered biologically safe for drinking.

Suitable materials used to form the selectively permeable membrane 22 include pure regenerated natural cellulose membranes such as those sold under the trade mark SPECTRA/PORE membranes.

The plastic bag 12 is open at one end and serves as a container which in use of the kit 10 as shown in FIG. 1, holds both the volume of water 20 to be treated and the packet of solid chemical reactants 16.

To treat water with a higher saline content safely, such as ocean and landlocked sea waters found at mid-latitudes, the ratio of reactant 16 to volume of water 20 is simply be increased. In this regard the bag 12 is embossed with a number of fill indicator lines 24, each designating differing volumes of water for use with the packet of reactant 16 provided. Each fill line 24 is selected to provide an indication of an optimum volume of sea water of an expected salinity given the geographical location where the kit 10 is to be used, and having regard to the quantity of reactant 16 supplied.

The organic filter 14 preferably contains within a plastic housing 26, a quantity of activated charcoal (not shown). As is to be understood, the housing 26 is configured to permit water flow therethrough about the charcoal, while preventing movement of the activated charcoal into the bag 12. As water passes through the housing 26 into contact with the activated charcoal, organics and micro-organisms in the water are removed by absorption or adsorption on to the charcoal.

As shown best in FIG. 2, the kit 10 is preferably packaged for storage within the bag 12, with the edges of the bag 12 folded tightly about both the packet of reactant 16 and filter 14. A releasable strip 28 is provided to seal the edges of the bag 12 closed, preventing moisture from contacting the reactant 16. By packaging the kit 10 as shown in FIG. 2 the packet of reactant 16 is kept dry to prevent its premature activation, even on immersion of the kit 10 in water.

A single kit 10 or several separtate kits 10 may be stored for future use in the pocket of a ocean survival suit or life jacket (not shown), to supply the personal water needs of the individual for a given number of days. The solid reactant 16 used in the kit 10 permits its long term storage until needed. The shelf life of the kit 10 advantageously permits it to be permanently stitched into a pocket of a life jacket or survival suit to reduce the likelihood the kit 10 may be misplaced and eliminate the need for periodic inspections. If desired, a number of larger separate kits 10 may be stored within a life boat or inflatable life raft, each supplying the water needs of several individuals.

In use of the present invention, the kit 10 is housed in the pocket of a survival suit ready for future use. A sailor wearing the survival suit may by the use of the kit 10 render a quantity of sea water safe to drink.

To treat sea water, the strip 28 is torn away and the bag 12 is unfolded. The packet of reactant 16 is then removed from the bag 12 and kept initially dry. The organic filter 14 is positioned in the opening of the bag 12 and the sides of the bag 12 are grasped tightly about the filter 14 to prevent sea water from passing between the edge of the filter 14 and the bag 12. Sea water is then introduced into the bag 12 via the filter 14 by dragging the bag 12 and filter 14 through the water until the bag 12 is filled with water 20 to the desired fill line 24.

The filter 14 is then removed and the selectively permeable membrane 22 containing the chemical reactant 16 is then inserted into the bag 12 and emersed in the water 20 to commence the chemical reactions.

As the buffering carbonate ($CO_3^=$) and/or bicarbonate ($HCO_3^-$) ions bond with free hydrogen ($H^+$) ions by the chemical reactions (I) through (VIII), an effervescence is produced within the bag 12 as a result of the carbon dioxide ($CO_2$) molecules being formed and released. Once the main chemical reactions bringing about the substitution of ions for sodium ($Na^+$) cations and chloride ($Cl^-$) anions is complete, $CO_3^=$, $HCO_3^-$ and $H^+$ ions are no longer released, and the production of carbon dioxide ceases. The ceasing of the effervescence thereby provides the user with a visual indicator that sufficient quantities of free chloride ($Cl^-$) and sodium ($Na^+$) ions have been removed to render the water 20 biologically safe to drink.

With the ceasing of effervescence, the packet of reactant 16 is then removed from the bag 12 and either discarded or kept for recycling and the user may then safely drink the treated volume of water 20.

After use the kit 10, the packet of reactant 16 is preferably kept for recycling. The cation exchange resin having the sodium ($Na^+$) ions bound thereto is recycled by mixing the resin [Resin bound $Na^+$] in a solution containing a high concentration of dissolved calcium chloride ($CaCl_2$). Free calcium ($Ca^{+2}$) ions in the solution preferentially substitute for the sodium ($Na^+$) ions on the resin, bonding with the cation exchange resin under the reaction:

$$[\text{Resin bound } Na^+(2)] + Ca^{+2} \rightarrow [\text{Resin bound } Ca^{+2}] + 2Na^+ \quad (IX)$$

Next, the resulting calcium bonded resin [Resin bound $Ca^{+2}$] and free sodium ($Na^+$) ion solution is then washed with deionized water, removing the sodium ($Na^+$) ions and isolating the resin [Resin bound $Ca^{+2}$]. The isolated resin [Resin bound $Ca^{+2}$] is then immersed in a highly acidic solution of oxalic acid. The oxalic acid bonds with the calcium ($Ca^{+2}$) ions to produce a calcium oxalate precipitate and the initial cation exchange resin having bound hydrogen ($H^+$) ions, under the reaction:

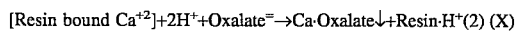

$$[\text{Resin bound } Ca^{+2}] + 2H^+ + Oxalate^= \rightarrow Ca \cdot Oxalate\downarrow + Resin \cdot H^+(2) \quad (X)$$

The resulting resin (Resin·$H^+$) may then be reused as part of the chemical reactant 16.

In a clinical study of the invention, 1.5 litres of sea water was obtained from the Atlantic Ocean at Halifax harbour, Halifax, Canada. To the volume of sea water was added 315 grams of reactant comprising: (a) 100 g of $Ag_2CO_3$; (b) 170 g of Dowex ($H^+$) resin; and (c) 45 g of a Bicarbonate resin (comprising a Dowex chloride resin which was converted to a bicarbonate resin by mixing with sodium bicarbonate and washing). After completion of the resulting reaction, and accounting for absorption of water by the resins, one litre of treated water was produced. A chemical analysis of the treated sea water, set out in Table 2, revealed the treated water to be biologically safe to drink, with all chemical and trace metals to be below tolerable limits.

TABLE 2

Chemical and Trace Metals Analysis of Treated Seawater

| Trace Metals Analysis Element | ppb | | Chemical Analysis | | Mg/L | |
| --- | --- | --- | --- | --- | --- | --- |
| Be | 0.05 | <W | Hardness (total) | as $CaCO_3$ | 1.0 | <T |
| B  | 3729.08 |   | Calcium | as Ca | <.2 | <W |
| Al | 42.92 |   | Magnesium | as Mg | .10 | <T |
| Ti | 2.99 | <T | Sodium | as Na | 12.0 | |
| V  | 0.36 | <T | Potassium | as K | .31 | |
| Cr | 4.59 | <T | Alkalinity | as $CaCO_3$ | 20.3 | |
| Mn | 0.97 |   | Chloride | as Cl | <.20 | <W |
| Fe | 44.82 | <T | Sulphate | as $SO_4$ | 7.66 | |
| Ni | 1.24 | <T | Ammonium (Nitrogen) | as N | .15 | <T |
| Co | 0.22 | <T | Nitrates (Nitrogen) | as N | .15 | <T |
| Cu | 38.12 |   | Nitrite (Nitrogen) | as N | .005 | <T |
| Zn | 19.90 | | | | | |
| As | 0.05 | <W | | | | |
| Se | 1.00 | <W | | | | |
| Sr | 1.35 | | | | | |
| Mo | 0.17 | <T | | | | |
| Ag | 982.03 | | | | | |
| Cd | 0.10 | <T | | | | |
| Sb | 0.27 | <T | | | | |
| Ba | 9.13 | | | | | |
| Tl | 0.05 | <W | | | | |
| Pb | 2.06 | | | | | |
| U  | 0.05 | <W | | | | |

>T-means a measurable trace amount: interpret with caution
>W-means a measurable amount: < reported value Preferably therefore approximately 30 to 100 grams, and more preferably 60 to 75 grams of $Ag_2CO_3$ is provided in the reactant to treat each litre of sea water. The cation exchange resin may also preferably be provided in the reactant in quantities up to 250 grams per litre of sea water, and more preferably 100 to 150 grams per litre of sea water. Lesser quantities of resin may however be used where the cation exchange resin undergoes raction (III) more fully to completion. It is to be further appreciated that excess quantities of anion exchange resins or other components may be provided where the reactions do not fully undergo completion. Where the weight of the kit 10 is a factor and smaller, lighter kits are desired, the quantity of reactant 16 may simply be reduced to produce less optimal but still biologically acceptable safe drinking water.

Although a solid compound or composition comprising $Ag_2CO_3$ has been disclosed as a preferred source of carbonate ions, other compounds or compositions which bond with free chloride ions and substitute therefore carbonate ions may also be used and will now become apparent. Similarly, while various cation and anion exchange resins have been disclosed as a component of the preferred deionizing reactant, it is to be appreciated that other compositions or compounds which effect a cation and anion exchange may also be used.

While a single packet of reactant has been disclosed, it is to be appreciated that the compounds, compositions and resins of the reactant may equally be packaged separately or in other combinations for either simultaneous or sequential immersion in the volume of water to be treated.

While a kit incorporating a plastic bag and an activated charcoal filter has been disclosed, it is to be appreciated other containers and other organic filters may equally be used and will now become readily apparent. If desired, the organic filter may be omitted in a less preferred, more space efficient kit.

Although the disclosure describes and illustrates preferred embodiments and examples of the invention, the invention is not so limited. Many variations and modifications will now occur to those skilled in the art. For a definition of the invention, a reference may be made to the appended claims.

We claim:

1. A method of producing biologically safe drinking-water from saline water comprising the steps of:

contacting said water with a first means selected to chemically bond with chloride anions in said water and to exchange for said chloride anions, anions selected from the group consisting of carbonate ions and bicarbonate ions, and contacting said water with a second means selected to chemically bond with sodium cations in said water and to exchange for said sodium cations, hydrogen ions, wherein said anions selected from the group consisting of carbonate ions and bicarbonate ions buffer said hydrogen ions to produce carbon dioxide and water, and whereby when said first means exchanges said carbonate ions for said chloride ions, said first means is selected from the group consisting of a compound comprising $Ag_2CO_3$ and a composition comprising $Ag_2CO_3$, and when said first means exchanges said bicarbonate ions for said chloride ions, said first means is selected from the group consisting of a compound comprising $AgHCO_3$ and a composition comprising $AgHCO_3$.

2. A method as claimed in claim 1 wherein said second means comprises a cation exchange resin having hydrogen ions releasably bound thereto.

3. A method as claimed in claim 2 comprising the further step of contacting said water with a third composition selected to chemically bond with sulphate anions in said water and exchanging for said sulphate anions, anions selected from the group consisting of carbonate ions, bicarbonate ions and hydroxyl ions.

4. A method as claimed in claim 3 wherein said third composition comprises an anion exchange resin having anions selected from the group consisting of carbonate ions, bicarbonate ions and hydroxyl ions releasably bound thereto.

5. A method as claimed in claim 4 wherein said cation exchange resin comprises polystyrene having a sulfonic acid group bound thereto.

6. A method as claimed in claim 5 wherein said saline water is sea water.

7. A method as claimed in claim 2 wherein said anions comprise carbonate ions and said first means is a compound comprising solid $Ag_2CO_3$.

8. A method as claimed in claim 2 wherein said anions comprise carbonate ions and said first means is a composition comprising solid $Ag_2CO_3$.

9. A portable water treatment kit for providing biologically safe drinking-water from sea water, said kit comprising a container and reactant, said container for holding a volume of said sea water and said reactant, and having an inlet for introducing said water into said container, said reactant comprising:

chloride ion bonding means for removing chloride ions from said sea water and exchanging for said chloride ions anions selected from the group consisting of carbonate ions and bicarbonate ions, means for removing sodium cations from said sea water and exchanging for said sodium cations hydrogen ions, said means for removing sodium cations comprises a cation exchange resin having hydrogen ions releasably bound thereto, and said chloride ion bonding means exchanging carbonate ions for said chloride ions being selected from the group consisting of a compound comprising $Ag_2CO_3$ and a composition comprising $Ag_2CO_3$, and said chloride ion bonding means exchanging bicarbonate ions for said chloride ions being selected from the group consisting of a compound comprising $AgHCO_3$ and a composition comprising $AgHCO_3$, wherein said reactant further comprises means for removing sulphate anions from said sea water and exchanging for said sulphate anions, ions selected from the group consisting of carbonate ions, bicarbonate ions and hydroxyl ions.

10. A water treatment kit as claimed in claim 9 wherein said means for removing sulphate anions comprises an anion exchange resin having anions selected from the group consisting of carbonate ions, bicarbonate ions and hydroxyl ions releasably bound thereto.

11. A water treatment kit as claimed in claim 10 wherein said container comprises a clear plastic bag.

12. A water treatment kit as claimed in claim 9 wherein said reactant comprises $Ag_2CO_3$ in an amount of 30 to 100 grams for each litre of sea water which said container is sized to hold.

13. A water treatment kit as claimed in claim 9 wherein said cation exchange resin is present in an amount of not more than 250 grams for each litre of sea water which said container is sized to hold.

14. A water treatment kit as claimed in claim 9 further comprising means for removing organic matter from said water.

15. A water treatment kit as claimed in claim 14 wherein said means for removing organic matter comprises an organic filter configured to be positioned across said inlet.

16. A portable water treatment kit for providing biologically safe drinking-water from sea water, said kit comprising a container and reactant, said container for holding a volume of said sea water and said reactant, and having an inlet for introducing said water into said container, said reactant comprising:

chloride ion bonding means for removing chloride ions from said sea water and exchanging for said chloride ions anions selected from the group consisting of carbonate ions and bicarbonate ions, and means for removing sodium cations from said sea water and exchanging for said sodium cations hydrogen ions, said means for removing sodium cations comprises a cation exchange resin having hydrogen ions releasably bound thereto, and said chloride ion bonding means exchanging carbonate ions for said chloride ions being selected from the group consisting of a compound comprising $Ag_2CO_3$ and a composition comprising $Ag_2CO_3$, and said chloride ion bonding means exchanging bicarbonate ions for said chloride ions being selected from the group consisting of a compound comprising $AgHCO_3$ and a composition comprising $AgHCO_3$, and wherein said reactant is encapsulated within a selectively permeable membrane.

17. A water treatment kit as claimed in claim 16 wherein said reactant comprises $Ag_2CO_3$ in an amount of 30 to 100 grams for each litre of sea water which said container is sized to hold.

18. A water treatment kit as claimed in claim 16 wherein said cation exchange resin is present in an amount of not more than 250 grams for each litre of sea water which said container is sized to hold.

19. A water treatment kit as claimed in claim 16 further comprising means for removing organic matter from said water.

* * * * *